United States Patent [19]
Gaetano

[11] Patent Number: 5,534,971
[45] Date of Patent: Jul. 9, 1996

[54] METHOD AND APPARATUS FOR SELECTIVELY COMPOSING THE CONTENT OF A PHOTOGRAPH

[75] Inventor: Ralph R. Gaetano, Bethel Park, Pa.

[73] Assignee: Think, Inc., West Mifflin, Pa.

[21] Appl. No.: 342,821

[22] Filed: Nov. 21, 1994

Related U.S. Application Data

[63] Continuation of Ser. No. 108,936, Aug. 18, 1993, abandoned.

[51] Int. Cl.$^6$ ................................................ G03B 27/58
[52] U.S. Cl. ............................................. 355/126; 355/74
[58] Field of Search ...................................... 355/74, 126

[56] References Cited

U.S. PATENT DOCUMENTS

| | | |
|---|---|---|
| 1,148,554 | 8/1915 | Vandenburg . |
| 1,745,900 | 2/1930 | Lowen . |
| 2,108,295 | 2/1938 | Prucha ........................... 248/1 |
| 3,593,228 | 7/1971 | Miyauchi ....................... 355/18 |
| 3,709,591 | 1/1973 | Alzmann ....................... 355/126 |
| 4,202,624 | 5/1980 | Krehbiel ........................ 355/45 |
| 4,249,822 | 2/1981 | Breslau ......................... 355/74 |
| 4,620,786 | 11/1986 | Hurd et al. ................... 355/72 |
| 4,970,547 | 11/1990 | Desai ............................ 355/61 |
| 5,097,289 | 3/1992 | Lucht et al. ................. 355/55 |
| 5,115,271 | 5/1992 | Hagopian ..................... 355/74 |

*Primary Examiner*—Russell E. Adams
*Assistant Examiner*—D. P. Malley
*Attorney, Agent, or Firm*—Price & Adams

[57] ABSTRACT

A masking guide includes a plurality of masking frames each having a different peripheral dimension for positioning the frames concentrically one within another in a nested arrangement. Each masking frame has an aperture and the dimensions of the aperture vary from a base frame having an aperture of greatest dimension to an innermost masking frame having an aperture of the least dimension. The masking frames are positioned so that the dimensions of the apertures progressively decrease from the base frame to the innermost frame. The frames are pivotally connected one within another, permitting the frames to be raised and lowered relative to a proof. A photographic proof is positioned in underlying relation with the masking guide. The proof has a full print area which is exposed entirely through the aperture of the base frame. The remaining frames mask a selected portion of the full print area of the proof. As the masking frames are progressively moved into a position overlying the proof to expose the proof through each masking frame, a percentage of the print area is excluded from exposure through the aperture. Each masking frame corresponds to a negative mounting card having an aperture exposing the same print area or composition of the negative as the area of the proof which is exposed. Once the desired composition of a proof is selected from a masking frame, the corresponding negative mounting card is used to mount the negative.

20 Claims, 4 Drawing Sheets

METHOD AND APPARATUS FOR SELECTIVELY COMPOSING THE CONTENT OF A PHOTOGRAPH

CROSS REFERENCE TO RELATED APPLICATIONS

This application is a continuation of application Ser. No. 108,936 filed on Aug. 18, 1993, now abandoned, entitled "Method And Apparatus For Selectively Composing The Content Of A Photograph".

BACKGROUND OF THE INVENTION

1. Field of the Invention

This invention relates to a method and apparatus for cropping a photographic proof to produce a final print having a desired composition selected from the proof and more particularly to a device for identifying the required negative mounting card for producing photographic prints having a selected composition taken from the full print area.

2. Description of the Prior Art

In the production of photographic prints from negatives, the negatives are mounted on negative or "crop" cards where the negative is positioned in overlying relation within an opening of the crop card. The size of the opening determines what portion of the full print area of the negative will be printed. Accordingly, the full print area is cropped using a negative card with an opening having an area less than the opening for printing the full composition of the negative. By providing a set of crop cards of progressively reduced window opening, the photographer is provided with the ability to select a portion of the full print area for final printing. In this manner, extraneous or undesirable portions of the full print area of the proof are excluded from the final print.

Conventionally, crop cards are made for each type of film format, such as 46 mm, 35 mm, 70 mm, etc. In other words, the film size will determine what type of crop cards are required to be used in printing the negatives. In addition, the size of the window or aperture of a crop card has a preselected height-to-width proportion for the production of prints of a desired dimension, for example, 4×5, 8×10 or 5×5, 8×8. In a set of crop cards for producing 4×5 or 8×10 prints where the size of the opening for each card has a different area, the height-to-width proportion for each card is the same.

The size of each print is identical, i.e. 4×5 or 8×10, but the composition of the printed area varies as determined by the size of the opening of the crop card used to prepare the print. Any number of crop cards, for example size A–E, for a selected film size are available for custom cropping of the full print area. Each crop card provides a different print area from a minimum area using crop card A to a maximum print area corresponding to the full print area of the negative using crop card E.

The cropping procedure has conventionally been performed by the photographer or the photolab technician. The photographer takes the pictures for the customer and generates a set of proofs for inspection by the customer. The photographer makes the decisions without any input from the customer as to the extent of cropping of the negatives. Similarly, when an individual takes the pictures and has them developed by a photolab, the technician mounts the negatives and produces the prints without any contribution from the customer as to the final composition of the prints.

While negative mounting cards can be used to select the portion of the negative to be printed, it is difficult to view a negative in a crop card to identify the area to be printed without the use of a light box. Therefore, the conventional practice is to select the desired area to be printed from a "proof" of the photographic print. A well known device for cropping a photograph is a sliding arrangement of two L-shaped plates that form a substantially rectilinear aperture. The proof is positioned in overlying relationship with the center point of the aperture and the plates are moved to vary the size of the aperture in a relationship to the full print area of the photograph. Thus, the print not visible through the aperture is masked.

Movement of the plates relative to another adjusts the size and area of the aperture. Throughout the range of movement, the ratio of height-to-width of the aperture remains the same for all sizes. The visible area of the proof changes, but the proportion of height-to-width remains the same for all adjusted areas. Once the selected print area is identified and the desired portions of the full print area have been masked, the selected print areas are marked so that the negative is mounted on a crop card with the corresponding area viewable through the opening of the crop card. The negative is printed, and the final product is a photograph of a conventional dimension but cropped to include only the desired composition from the full print area.

U.S. Pat. Nos. 3,709,591 and 5,115,271 disclose the above-described sliding plate type cropping devices. These devices are commonly used by photographers and photolab technicians but not by the amateur or recreational photographer. The devices are expensive and would not normally be purchased by the amateur photographer. Also they require a considerable amount of skill and know how in their successful operation. Therefore, there is Deed for a cropping device that provides the amateur photographer with the capability of cropping photographs.

In those cases where a customer retains the services of a professional photographer it is common practice for the photographer and the customer to view together the initial proofs of the photographs taken by the photographer to identify those proofs which are to be finally printed. This is frequently encountered in the photographing of a wedding ceremony.

It is not uncommon for a proof to be selected, but objection raised to certain elements in the composition of the proof. It may be desired to eliminate certain extraneous background elements or to concentrate the print area on a specific subject. A decision is then made to crop out the undesired composition from the full print area. This has been conventionally left to the discretion of the photographer with information received from the customer. However, the customer may not be able to accurately visualize the composition of the crop print and may not agree with the decision made by the photographer who had something else in mind when he cropped the print.

Therefore, there is need for a device used in the cropping of photographic prints that allows the viewer to easily and accurately identify from the full print area the composition selected to appear in the final print with the undesired composition excluded.

SUMMARY OF THE INVENTION

In accordance with the present invention, there is provided apparatus for selectively masking a photographic proof to obtain a print of selected sight area that includes a base frame including four side portions connected in end to end relation to form a rectilinear aperture. The rectilinear aperture has an area corresponding to the unmasked area of a photographic proof and a center point. A plurality of masking frames each has a configuration corresponding to the base frame with a rectilinear aperture and a center point. Each of the apertures of the masking frames has an area less than the base frame aperture area. Each of the masking frames has a progressively decreasing aperture area from an outer frame positioned within the base frame to an inner frame with a plurality of intermediate frames positioned between the outer frame and the inner frame. The base frame and the masking frames are concentrically positioned so that the center points are positioned in overlying relationship. Means is provided for pivotally connecting the outer masking frame to the base frame for movement of the outer masking frame into and out of position exposing a selected print area of the photographic proof. The intermediate masking frame positioned adjacent to the outer masking frame is pivotally connected thereto with the remaining intermediate masking frames successively pivotally connected to one another and finally to the inner masking frame. The masking frames are selectively movable into and out of position for exposing a selected print area of the photographic proof.

Further in accordance with the present invention, there is provided a method for selecting the area of a proof to be printed in a photographic process comprising the steps of positioning a base frame in overlying relation with a photographic proof. The entire print area of the proof is viewed through a window opening in the base frame. A plurality of masking frames each having a window opening are positioned concentrically within the base frame with the frames having a common center. The area of the window openings of the masking frames are proportionally reduced from an outer frame adjacent to the base frame to an inner frame with intermediate frames positioned between the outer and inner frames. Each frame is pivotally connected to an adjacent frame from the inner frame to the intermediate frames to the outer frame with the outer frame pivotally connected to the base frame. All of the masking frames are pivoted to a position where only the base frame overlies the photographic proof and the full printed area of the proof is seen through the window opening in the base frame. One by one each masking frame from the outer masking frame to the inner masking frame is pivoted into overlying position with the proof. The print area of the proof is viewed individually through the window opening of each masking frame. The print area of the proof viewable through the window openings proportionally decreases from the outer masking frame to the inner masking frame. The viewable print areas of the masking frames are compared to identify a selected print area. A print area of the proof viewable through one of the masking frames is selected for printing.

Further in accordance with the present invention there is provided a system for selecting the composition of the photographic print taken from the full print area of a proof that includes a concentric arrangement of a plurality of masking frames each having an aperture of a selected area for viewing a portion of the full print area of the proof. The masking frames are positioned one within another from an outermost masking frame having an aperture for viewing the full print area to an innermost masking frame having an aperture for viewing a minimum amount of the print area. The masking frames have a common center. Means for pivotally connecting each masking frame to an adjacent masking frame permits positioning a selected masking frame in overlying relation with the proof to view a portion of the print area through the aperture with the remainder of the proof outside of the aperture concealed from view. A plurality of negative cards is used for mounting a negative of the proof for printing. The negative cards each have a crop opening for exposing a selected area of the negative to be printed. The negative cards are matched with the masking frames so that the crop opening of each of the negative cards exposes the same composition to be printed as the composition of the print viewable through the aperture of a corresponding one of the masking frames. Means is provided for identifying the negative cards matching the masking frame so that the negative is mounted on a selected one of the negative cards for producing a print having the desired composition viewed through the aperture of the masking frame.

Accordingly, a principal object of the present invention is to provide a method and apparatus for selecting the composition and size of a photographic print.

Another object of the present invention is to provide a crop selecting device for use in masking the area of a photographic proof to be excluded from the print area appearing in the composition of the final print.

A further object of the present invention is to provide a system in the production of photographic prints that includes a concentric arrangement of connecting masking frames each corresponding to a negative mounting card having a preselected opening for exposing a desired portion of the negative to be printed.

An additional object of the present invention is to provide the recreational and amateur photographer with an inexpensive and efficient device for custom selecting the composition of a print so that undesired composition of the print is excluded.

These and other objects of the present invention will be more completely disclosed and described in the following specification, the accompanying drawings, and the appended claims.

DESCRIPTION OF THE PREFERRED EMBODIMENTS

Figure 1:
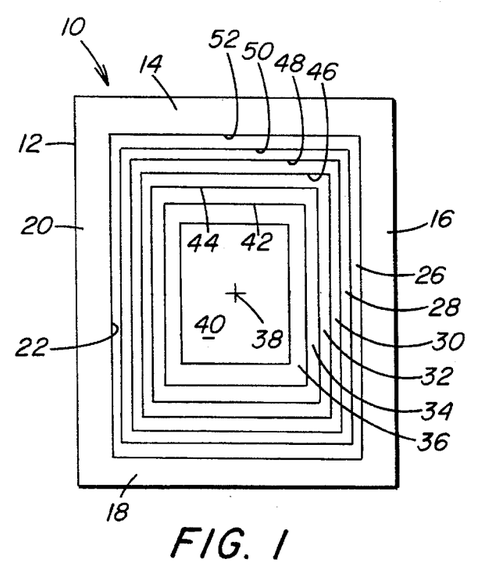
FIG. 1 is a plan view of a masking guide for selecting the composition of a photographic proof to be printed from the entire print area of the proof, illustrating a concentric arrangement of masking frames positioned one within another.
Figure 2:
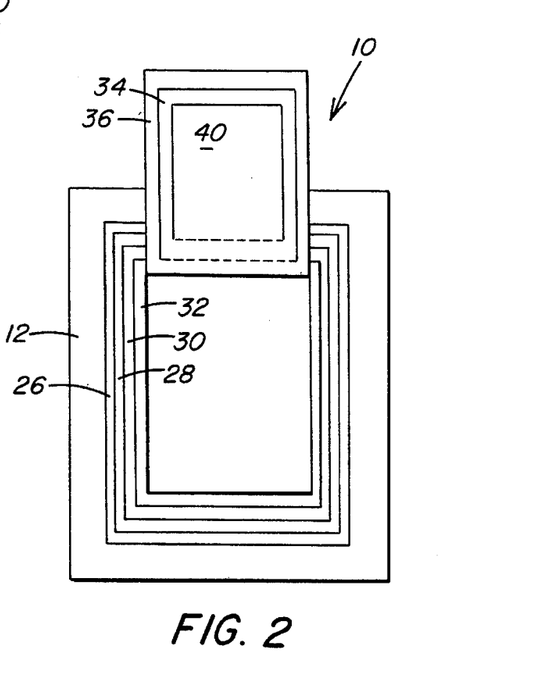
FIG. 2 is a plan view of the masking guide shown in FIG. 1, illustrating two of the masking frames pivoted to position a selected masking frame for exposing a desired area of the proof to appear in the final print.
Figure 3:
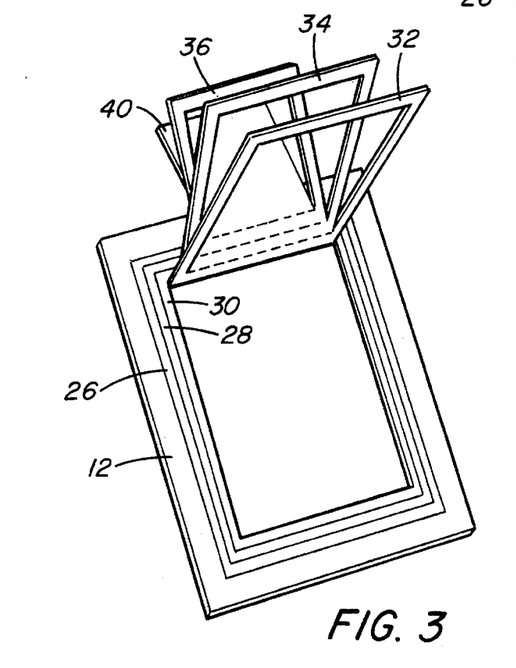
FIG. 3 is an isometric view of the masking guide shown in FIGS. 1 and 2, illustrating the concentric arrangement of masking frames concentrically and pivotally connected one to another.
Figure 4:
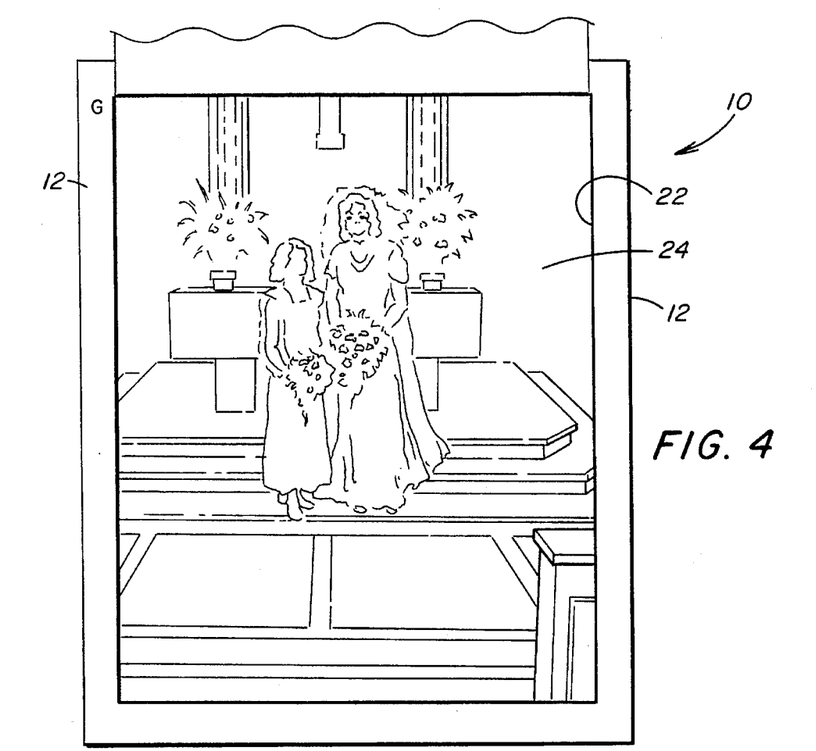
FIG. 4 is an enlarged fragmentary view of the masking guide positioned in overlying relation with a photographic proof, illustrating the proof viewed through the base frame having a sight area which exposes the full print area of the proof.

Referring to the drawings and particularly to FIGS. 1–3, there is illustrated a masking guide generally designated by the numeral 10 for use in selecting the desired composition of a proof to be printed by mounting the negative on a mounting card for production of a final print. The final print has a composition corresponding to the composition of the proof viewed through the masking guide. The masking guide includes a plurality of pivotally connected frames each having a proportionally decreasing aperture area. A first or base frame 12 includes four side portions 14, 16, 18 and 20 each integrally connected in end to end relation to form a rectilinear aperture 22. The aperture 22 surrounds an area which corresponds to the unmasked area of a photographic proof, as shown in FIG. 4. When a photographic proof 24, as illustrated in FIG. 4, is positioned in underlying relation with the base frame 12. The full print area or composition of the photographic proof is viewable or exposed through the base frame aperture 22.

If final prints are produced having the full print area as viewed through the base frame 12, the negative which was used to produce the proof is positioned on a conventional mounting or crop card having a crop opening. When the negative is mounted on the card the same composition or print area is viewable through the aperture 22 of the base frame 12. Thus, a specific crop card is used to produce a print having the entire composition of the negative.

In the event, it is desired to "customize" the proof to obtain a final print having a composition less than the composition of the full print area, the masking guide 10 permits selective customization of the proof. The masking frames provide a range of progressively decreasing print areas. This is achieved by the concentrically positioning within the base frame 12, a plurality of masking frames, such as frames 26, 28, 30, 32, 34 and 36 shown in FIG. 1.

Each of the masking frames 26–36 has a configuration corresponding to the configuration of the base frame 12. Each masking frame includes a rectilinear aperture 22 and a center point 38. When the frames of the masking guide 10 are concentrically positioned as shown in FIG. 1, center point 38 is common to all the frames.

The aperture 22 of each masking frame has an area less than the area of the aperture 22 for base frame 12. The aperture area progressively decreases from the outer masking frame 26 to the inner masking frame 36. Positioned between the outer masking frame 26 and tile inner masking frame 36 are a plurality of intermediate masking frames 28, 30, 32 and 34. With this arrangement, tile aperture area of the masking frames 26–36 decreases in area permitting the masking frames to be positioned one within the other or nested so that in assembled relation, a solid border is provided from the aperture of the inner frame 36 to the base frame 12. In other words, when the frames are concentrically positioned, the aperture area of only the inner frame 36 is visible. If desired, the inner frame may be provided with a closure flap 40 as seen in FIGS. 2 and 3 which closes the aperture of the inner frame 36.

Each of the respective frames of the masking guide 10 are connected to one another from the innermost masking frame 36 to the base frame 12. Preferably, each frame is connected along the length of ohe edge to the opposite edge of the adjacent frame. For example, as seen in FIG. 1, the innermost masking frame 36 has an upper edge 42 which is connected or integrally formed with the opposite edge of the adjacent masking frame 34. In a similar arrangement, the masking frame 34 has an upper edge 44 connected to the opposite edge of adjacent masking frame 32. Correspondingly, masking frame 32 has an upper edge 46 connected to masking frame 30.

Masking frame 30 has an upper edge 48 connected to masking frame 28. Masking frame 28 has an upper edge 48 connected to masking frame 26. Masking frame 26 has an upper edge 52 connected to the base frame 12. With the above-described arrangement of serially connecting the masking frames, each masking frame is independently movable relative to the remainder of the masking frames. Also, if desired, the connection of the masking frames may be formed by a perforated line which permits the masking frames to be disconnected.

With the masking frames serially connected, a selected masking frame may be positioned in overlying relation with a proof to expose the portion of the print area of the proof through the respective aperture of the masking frame. For example, as shown in FIG. 2, the masking frames 34 and 36 and closure flap 40 are pivoted upwardly so that the aperture of the masking frame 32 is visible. Then when the guide 10 is positioned in overlying relation with the proof with the frames 34 and 36 pivoted upwardly, a limited portion of the print area of the proof is seen through the aperture of the masking frame 32. The remaining portion of the print area of the proof beyond the periphery of the masking frame 32 is concealed from view by the other concentrically positioned masking frames.

The user of the masking guide 10 can then determine whether or not the composition of the proof seen through the masking frame 32 is preferred over the composition that would be viewed through anyone of the other masking frames. To assist in making the decision as to what the preferred composition would be, the masking frames are moved so that progressively one by one each masking frame is positioned in overlying relationship with the proof. As the viewing of the print area of the proof progresses from one masking frame to the next, the user of the guide 10 can compare the composition of a print that would be produced using a cropping card corresponding to the masking frame that provides a view of the selected print area or composition.

The masking frames forming the masking guide 10 have a fixed ratio of the length to width for the aperture formed by the frame. This ratio can be based on any print size format, for example, 4×5, 5×7, 8×10, etc. Accordingly, each masking guide is made for a preselected print format and accordingly, to a preselected set of cropping cards for mounting a selected film size. In a 4×5 print format, the base frame 12 has an aperture dimension of 4×5. The adjacent masking frame 26 has an aperture dimension of 3.62×4.52 which is the same ratio of length to width as the base frame aperture.

Correspondingly, the adjacent masking frame 28 has an aperture dimension of 3.25×4.07. Masking frame 30 has an aperture dimension of 2.76×3.5. Masking frame 32 has an aperture dimension of 2.11×2.63. The dimensions of the remaining masking frames for the masking guide 10 constructed on a 4×5 format have identical ratios of length to width for the aperture of progressively decreasing print area.

Figure 7:
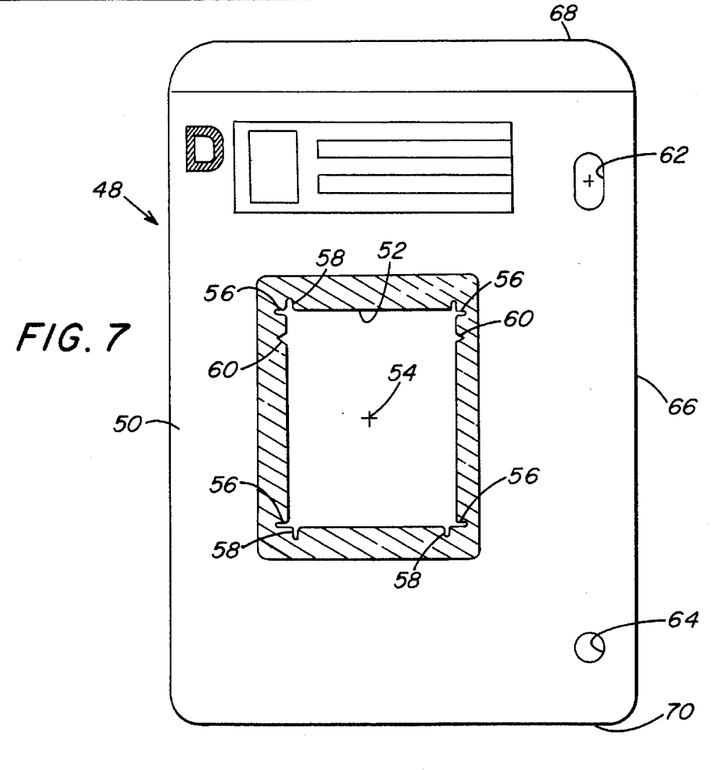
FIG. 7 is an enlarged schematic view of a negative mounting card, illustrating an aperture for exposing a selected sight area of a negative positioned on the card in overlying relation with the aperture.

Referring to FIG. 7, there is illustrated a negative mounting or crop card generally designated by the numeral 48. The crop card 48 is conventional in design and used in conjunction with the masking guide 10 of the present invention. The negative mounting card 48 is generally rectangular in configuration having a front face or surface 50 and a rear surface or face located within the body of the mounting card 48 is an aperture or a window 52 of a preselected size and geometric shape. Preferably, the aperture 52 is either square or rectangular in configuration. Regardless of the shape of the aperture 52, it is located in a preselected position on the mounting card 48 with respect to an optical center point 54 of the mounting card 48.

The aperture 52 of the mounting card 48 includes horizontal cropping slots 56 and vertical cropping slots 58. The cropping slots 56 and 58 identify for the photographer or the lab technician that portion of the negative which will appear in the final print of the negative. In addition, each aperture 52 includes a pair of oppositely positioned head portrait slots 60 which indicate to the photographer the recommended location to place a reference point, such as the head of a subject in a portrait, in the negative. In one example, when positioned between slots 60 the top of the subject's head will appear approximately 1¼ inches from the top edge of an 8×10 photographic print.

Further as illustrated in FIG. 7, the mounting card 48 includes an oblong pin registry hole 62 and a circular pin registry hole 64. The hole 62 and 64 are centered on a line spaced a preselected distance from edge 66 of the card 48 and the edges 68 and 70, respectively. Thus the holes 62 and 64 serve as reference points in locating the optical center point 54 of the mounting card 48. With this arrangement once the negative is secured to the rear face of the card 48 in underlying relation with the aperture 52, the photograph is printed having a composition with a print area corresponding to the position of the negative mounted on the card 48.

In the conventional process of printing the negative mounted on the card 48, the card is conveyed through a printing apparatus. Pin registry holes 62 and 64, being oriented with respect to the center point 54 of the card 48, serve to correctly position the card relative to the light source used in exposing the film negative.

The dimensions of the length and width of the aperture 52 for the negative mounting card 48 correspond to the dimensions of a selected print format, i.e. 4×5, 5×7, 8×10, etc. For these print formats, the length and width of the aperture has a preselected ratio. This ratio is fixed regardless of the dimensions of the length and width.

In printing photographs from the mounted negative, a set of crop cards is available for customizing the composition of the completed proof or print. The composition of the final print corresponds to the area of the aperture 52 as determined by the dimensions of the length and width of the aperture. Therefore, for a set of negative mounting cards 58 to produce 4×5 prints in which the composition of the print is determined by the size of the negative mounting card used, the aperture of each mounting card has the same length to width ratio, but the actual dimensions vary from card to card.

The dimensions of the aperture 52 for a mounting card 48 used to print a 4×5 print having a sight area corresponding to the full print area of the negative are 1.72×2.15 inches. Therefore, in use of the mounting guide 10, if the full print area of a negative was desired for the composition of the print, the negative mounting card corresponding to the base frame 12 would be used to print the photograph.

In use, the base frame 12 would be identified by the letter "G" then the negative mounting card for producing a print having the sight area viewable through the frame G is also identified by the letter "G". Thus, masking frame G corresponds to the negative mounting card G. Similarly, the masking frame 26 is designated by the letter "F" and the corresponding negative mounting card 48 is also designated by the letter "F". The dimensions of the negative mounting card F are 1.900×2.375 inches. These dimensions have the same ratio of length to width as the negative mounting card G corresponding to the masking frame 12.

The masking frame 28 is designated by the letter "E", and the corresponding negative mounting card is also designated by the letter "E". The dimensions of the negative mounting card E are 1.720×2.150 inches. Then the next masking frame 30 designated by the letter "D" corresponding to a negative mounting card "D" having an aperture dimension of 1.555× 1.944. The adjacent masking frame 32 is designated by the letter "C" corresponding to the negative mounting frame "C" having a length to width dimension of 1.400×1.750 inches. Thus, each of the negative mounting cards in a set has a different aperture area, but the ratio of the length to width of the aperture opening is the same for each negative mounting card in a set. With this arrangement, the photographer can be assured that the composition of the proof that he selects from one of the masking frames will correspond to the composition of the negative that is exposed during the printing process through the negative mounting card aperture 52.

Figure 6:
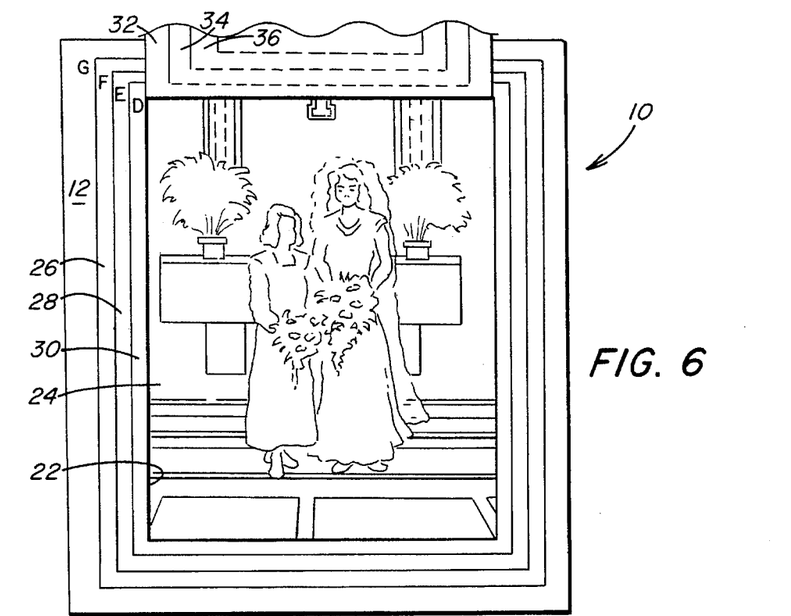
FIG. 6 is a fragmentary view of the masking guide similar to FIGS. 4 and 5, illustrating another one of the masking frames positioned on the proof to expose a print area having a composition less than that viewed through the masking frame shown in FIG. 4, but greater than that viewed in the masking frame shown in FIG. 5.

As shown in FIG. 7, the negative mounting card 48 is designated by the numeral "D". When a negative is mounted on the rear surface of the card D, the negative is exposed through the aperture 52. The exposed print area in the aperture 52 for the negative mounting card D corresponds to the print area exposed through the masking frame 30 as shown in FIG. 6. The masking guide 10 in FIG. 6 is positioned in overlying relation with the photographic proof 24 with the masking frames 32, 34 and 36 pivoted upwardly so that the print 24 is visible through the aperture 22 of the masking frame 30.

Figure 5:
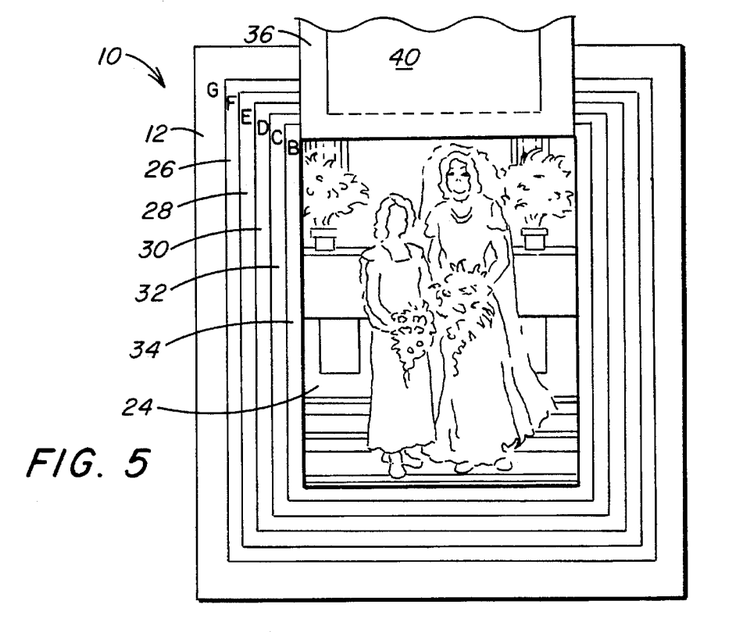
FIG. 5 is a fragmentary view of the masking guide similar to FIG. 4, illustrating the proof viewed through a masking frame having a sight area less than that of the base frame so that the composition of the proof is substantially reduced from the full print area to exclude the unwanted composition.

With the print 24 positioned in underlying relation with the masking frame 30, a selected composition or print area is visible. This print area for the masking frame 30 is less than the print area exposed when the base frame 12 is positioned over the proof 24 as shown in FIG. 4. However, the print area viewable through the masking frame 30 is greater than the print area visible through the masking frame 34 when positioned in overlying relation with the same proof 24 as shown in FIG. 5. In comparing the print area or composition viewable through the masking frame 12 shown in FIG. 4, the masking frame 34 shown in FIG. 5, and the masking frame 30 shown in FIG. 6, one can decide which of the exposed print compositions is preferred.

Using the masking frame 34 substantially all of the surrounding background is excluded from the print area. In comparison, the masking frame 12 provides a view of the entire print area of the proof. The masking frame 30 as shown in FIG. 6 exposes a composition having a background area between that exposed with masking frame 12 and that exposed with masking frame 34. The user of the masking frame 12 can then customize or select the composition which is to appear in the final print photograph. With each of the masking frames connected to one another, a quick comparison of the available compositions is made by flipping the masking frames into a position over the proof 24.

If the user determines that the masking frame D reveals the desired composition for the final print, then the negative for the proof is secured to the rear surface of the negative mounting card 48 designated by the letter "D" as shown in FIG. 7. With the negative secured to the rear surface of card 48 and aligned with the pairs of slots 56 and 58, the negative is printed to provide a photograph having the composition corresponding to that viewed through the masking frame D as shown in FIG. 6.

Referring to FIGS. 8A–8F, there is illustrated the sequence of steps in using the masking guide 10 to produce a photographic print having a preselected composition. The proof to be examined using the masking guide 10 is obtained by mounting the corresponding negative 72 to the rear surface of the negative mounting card 48 where the negative is exposed through the aperture 52. The mounted negative 72 is then printed to obtain the proof 24 which has a print area or composition corresponding to the full print area of the negative 72.

Figure 8A:
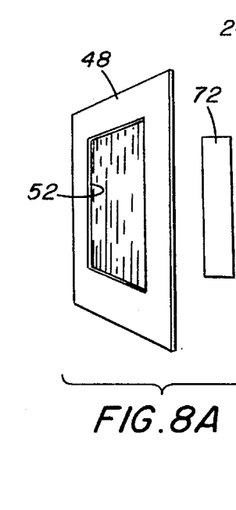
FIGS. 8A–8F are isometric illustrations of the method of using the masking guide for selecting the desired composition of the full print area of a proof which is finally printed from the negative.
Figure 8B:
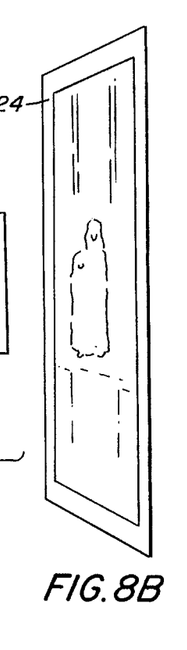
Figures 8C, 8D:
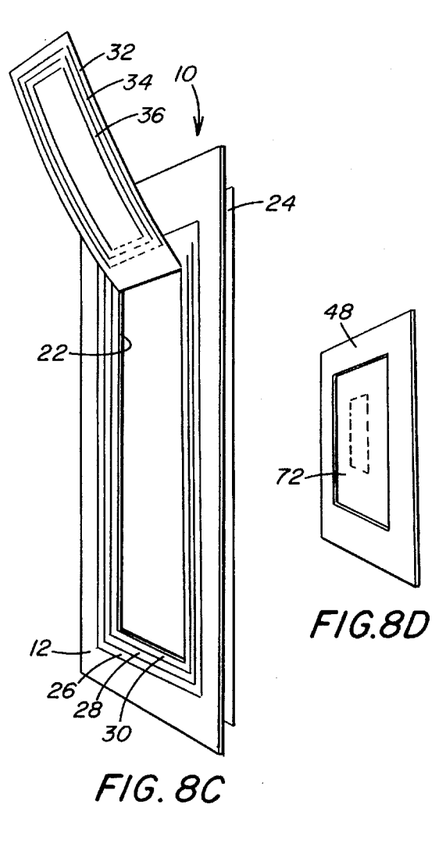

The proof 24 is then positioned in underlying relation with the masking guide 10 so that it can be viewed separately through each one of the masking frames. Each masking frame is separately positioned over the proof. The masking frames having an greater aperture area are pivoted upwardly permitting the proof to be viewed through the aperture of the selected masking frame. For example, as shown in FIG. 8C, the masking frames 32, 34 and 36 are pivoted upwardly so that the masking frame 30 is positioned flat on the surface of the proof permitting the proof to be viewed through the aperture 22 of the masking frame 30. The viewer then determines whether or not the print area or composition viewable through the masking frame 30 is the desired composition to form the final print.

Figure 8E:
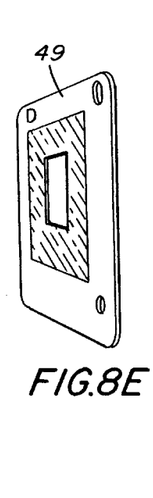
Figure 8F:
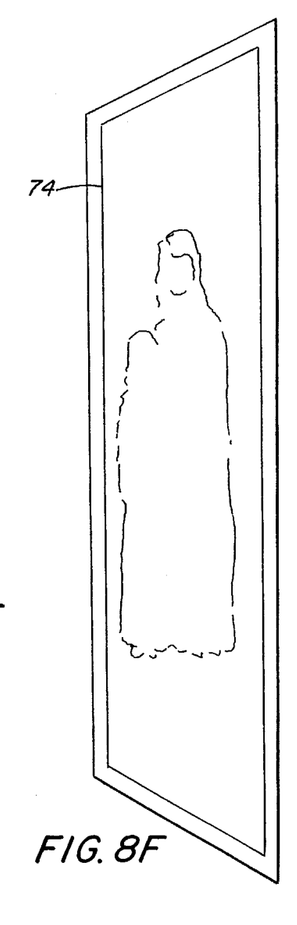

If it is the desired composition, then the crop card D corresponding to masking frame 30 is selected. In one mode of operation as shown in FIGS. 8D and 8E, the negative 72 is maintained on a mounting card 48 that exposes the full print area. Then if it is desired to reduce the full print area for final printing through the selection process using the mounting guide 10, the desired mounting card 49, for example crop card D, is positioned over the originally mounted negative on card 48 so that the desired sight area of the negative is exposed. The negative mounted on the crop card D is then printed to produce a final print 74 having a composition corresponding to the composition viewed through the negative mounted on the crop card D. Once the desired composition is selected, the final print can be produced in any size, and for each size of print the selected composition appears.

According to the provisions of the patent statutes, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for selectively masking a photographic proof to obtain a print of selected sight area comprising, a base frame including four side portions connected in end to end relation to form a rectilinear aperture, said rectilinear aperture having a center point and an area corresponding to the unmasked area of a photographic proof positioned underlying said base frame, a plurality of masking frames each having a four-sided configuration corresponding to said base frame including said four side portions, said rectilinear aperture, and said center point, said apertures of said masking frames having areas less than said base frame aperture area, said masking frames progressively decrease in aperture area from an outer frame positioned within said base frame to an inner frame with a plurality of intermediate frames positioned between said outer frame and said inner frame, said base frame, said outer frame, said intermediate frames, and said inner frame being concentrically positioned so that said center points are positioned in overlying relationship, means for pivotally connecting said masking frames serially to one another from said outer frame to said inner frame for independent pivotal movement of said masking frames into and out of position exposing a selected print area of the photographic proof positioned beneath said base frame through said aperture of said respective masking frame, said outer frame pivotally connected about a pivotal axis to said base frame where pivotal movement of said outer frame on said base frame pivots the remaining masking frames with said outer frame into and out of position concentrically positioned within said base frame, said inner masking frame being concentrically positioned within said adjacent intermediate masking frame and pivotally connected thereto with the remaining intermediate masking frames concentrically positioned and serially pivotally connected to one another and finally to said outer masking frame, and said masking frames each being selectively independently pivoted into and out of position for exposing a selected print area of the photographic proof to facilitate positioning a selected one of said masking frames into overlying relation with the proof for comparing the portion of the proof exposed through the opening of each masking frame.

2. Apparatus as set forth in claim 1 in which, said base frame and said masking frames have a preselected aperture dimension defined by a length and a width, said length and width of said aperture dimension being a maximum for said base frame and a minimum for said inner frame with said intermediate frames having an aperture dimension therebetween, said length and width of said aperture dimension forming a ratio, and said ratio being constant for said base frame and said masking frames.

3. Apparatus as set forth in claim 2 in which, said aperture dimension of each of said base frame and said masking frames is different and said length to width ratio of each of said base frame and said masking frames is the same.

4. Apparatus as set forth in claim 2 in which, said length to width ratio of said aperture dimension has a preselected value determined by the aperture dimension of said base frame.

5. Apparatus as set forth in claim 1 in which, said outer frame is positioned within said aperture of said base frame, said side portions of said base frame abutting said side portions of said outer masking frames, and a selected one of said outer masking frame side portions connected to an adjacent base frame side portion to allow pivotal movement of said outer masking frame between a first position within said base frame aperture to a second position removed from said base frame aperture so that a reduced portion of the entire print area of the photographic proof is viewed in said first position and the entire print area of the photographic proof is viewed in said second position.

6. Apparatus as set forth in claim 5 in which, said outer masking frame is pivotally connected along a selected side portion to said side portion of an adjacent one of said intermediate frames, and said intermediate frames being pivotally connected to one another along adjacently positioned selected side portions to allow the photographic proof to be viewed separately through said aperture of each intermediate frame and permit a comparison to be made of the sight area of the proof viewable through said aperture of each of said intermediate frames.

7. Apparatus as set forth in claim 6 in which, said side portions of said masking frames are positioned in abutting relation to form a solid peripheral border from said inner frame to said base frame when said masking frames are concentrically positioned, and said solid peripheral border being variable in width upon pivotal movement of said masking frames into and out of position overlying the photographic proof.

8. Apparatus as set forth in claim 1 which includes, means for separating said masking frames from connection to one another and said outer masking frame from connection to said base frame to provide a plurality of disconnected masking frames.

9. Apparatus as set forth in claim 1 which includes, a closure flap positioned within said aperture of said inner masking frame to completely fill said aperture so that the photographic proof is not viewable through said inner masking frame aperture, and said closure flap being connected to one of said inner masking frame side portions to allow movement of said closure flap to a position exposing the photographic proof through said aperture.

10. Apparatus as set forth in claim 1 in which, said masking frames are concentrically positioned one within another to form a nested arrangement of masking frames so that said center points are positioned in overlying relation, and each of said concentrically positioned masking frames being serially connected along a selected one of said side portions to allow for pivotal movement of each masking frame into and out of overlying relation with the print area of the photographic proof.

11. A method for selecting the area of a proof to be printed in a photographic process comprising the steps of, positioning a base frame in overlying relation with a photographic proof, viewing the entire print area of the proof through a window opening in the base frame, positioning a plurality of masking frames each having a window opening concentrically within the base frame with the frames having a common center, proportioning the area of the window openings of the masking frames with an outer masking frame positioned within the window of the base frame having a maximum window area, positioning a plurality of intermediate frames in a nested arrangement from the outer masking frame to an inner masking frame having a minimum window area, pivotally connecting each frame to an adjacent frame in series from the inner masking frame to the intermediate masking frames to the outer masking frame, pivotally connecting the outer masking frame to the base frame for independent movement of the outer masking frame into and out of position concentrically positioned to the base frame, pivoting all of the masking frames about the connection of the outer masking frame to the base frame upon pivotal movement of the outer masking frame on the base frame where movement of the outer masking frame moves the other masking frames, pivoting all of the masking frames to a first position where only the base frame overlies the photographic proof and the full printed area of the proof is seen through the window opening in the base frame, pivoting one by one each masking frame progressing from the outer masking frame to the inner masking frame from the first position into a position overlying the proof, and viewing individually the print area of the proof remaining fixed through the window opening of each masking frame as the masking frames are pivoted into and out of position over the proof from the outer masking frame to the inner masking frame to obtain a comparison of the viewable print areas for the masking frames.

12. A method as set forth in claim 11 which includes, dimensioning each of the window openings for a preselected length and width, and dimensioning the length and width of each window opening from the base frame having a maximum length to width dimension to the inner masking frame having a minimum length to width dimension.

13. A method as set forth in claim 12 which includes, selecting a preselected ratio of the length to the width of the window opening for the base frame, and providing the window openings of the outer masking frame, the intermediate masking frames, and the inner masking frame with the same ratio of length to width as the window opening for the base frame.

14. A method as set forth in claim 12 which includes, selecting the dimensions of the window opening in the base frame to correspond to the dimensions of a preselected size of the photographic proof.

15. A method as set forth in claim 11 which includes, moving a selected masking frame into overlying relation with the print area of the proof with the smaller masking frames pivoted to a position exposing a portion of the print area through the window opening of the selected masking frame and the larger masking frames concentrically surrounding the selected masking frame to provide a solid peripheral border therearound.

16. A method as set forth in claim 11 which includes, matching the base frame and each of the masking frames with a set of negative mounting cards each having apertures for exposing a print area of the negative corresponding to the same print area of the photographic proof viewable through the window opening, and selecting a negative mounting card from the set for mounting the negative to obtain a print having a print area corresponding to the print area viewable through the window opening of a selected one of the masking frames.

17. A system for selecting the composition of a photographic print taken from the full print area of a proof comprising, a concentric arrangement of a plurality of masking frames each having an aperture of a selected area for viewing a portion of the full print area of the proof, said masking frames positioned one within another from a base frame having an aperture for viewing the full print area to intermediate masking frames to an inner masking frame having an aperture for viewing a minimum amount of the print area, said masking frames each having a common center, each of said masking frames pivotally connected to a surrounding masking frame to serially connect said masking frames and permit movement of a selected masking frame into and out of overlying relation with the proof to view a portion of the print area through said aperture with the remainder of the proof outside of said aperture concealed from view, said inner masking frame being serially connected through said intermediate masking frames to said base frame so that pivotal movement of said intermediate masking frame adjacent to said base frame moves the remaining masking frames, a plurality of negative cards for mounting a negative of the proof for printing, said negative cards each having a crop opening for exposing a selected area of the negative to be printed, said negative cards matched with said masking frames so that said crop opening of each of said negative cards exposes the same composition of the negative to be printed as the composition of the print viewable through the aperture of a corresponding one of said masking frames, and a selected one of said negative cards receiving the negative for producing a print having a composition viewed through said aperture of said matching masking frame.

18. A system as set forth in claim 17 in which, said apertures of said masking frames are defined by a length and a width where the length and width of said apertures is different to permit said masking frames to be positioned in a nested arrangement.

19. A system as set forth in claim 18 in which, the length to width ratio of each of said apertures is constant.

20. A system as set forth in claim 17 in which, said concentric arrangement of masking frames forms a solid border extending outwardly from said aperture of each of said masking frames so that when a selected masking frame is positioned to expose a print area of the proof only the print area within said aperture is exposed.

* * * * *